May 21, 1957 F. S. BATEMAN 2,793,073
SPRAYING APPARATUS
Filed Sept. 15, 1955 2 Sheets-Sheet 1
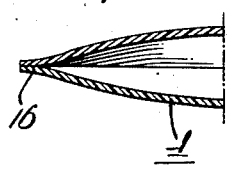
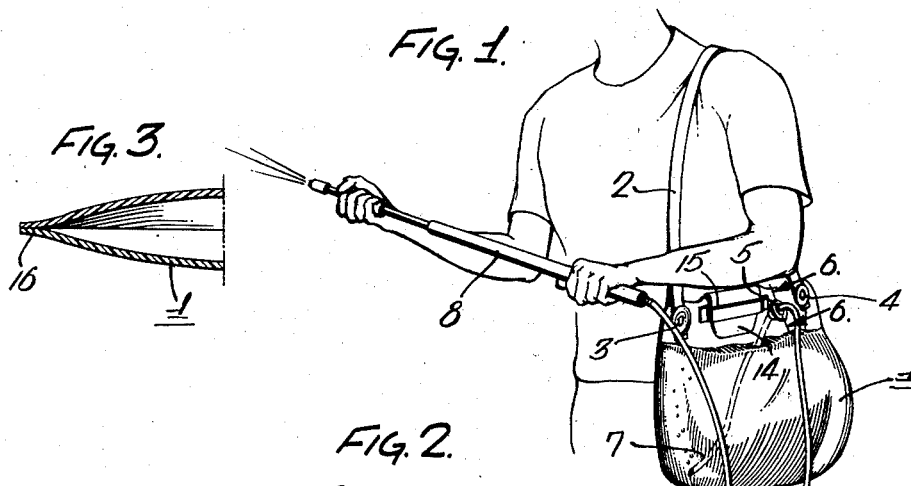
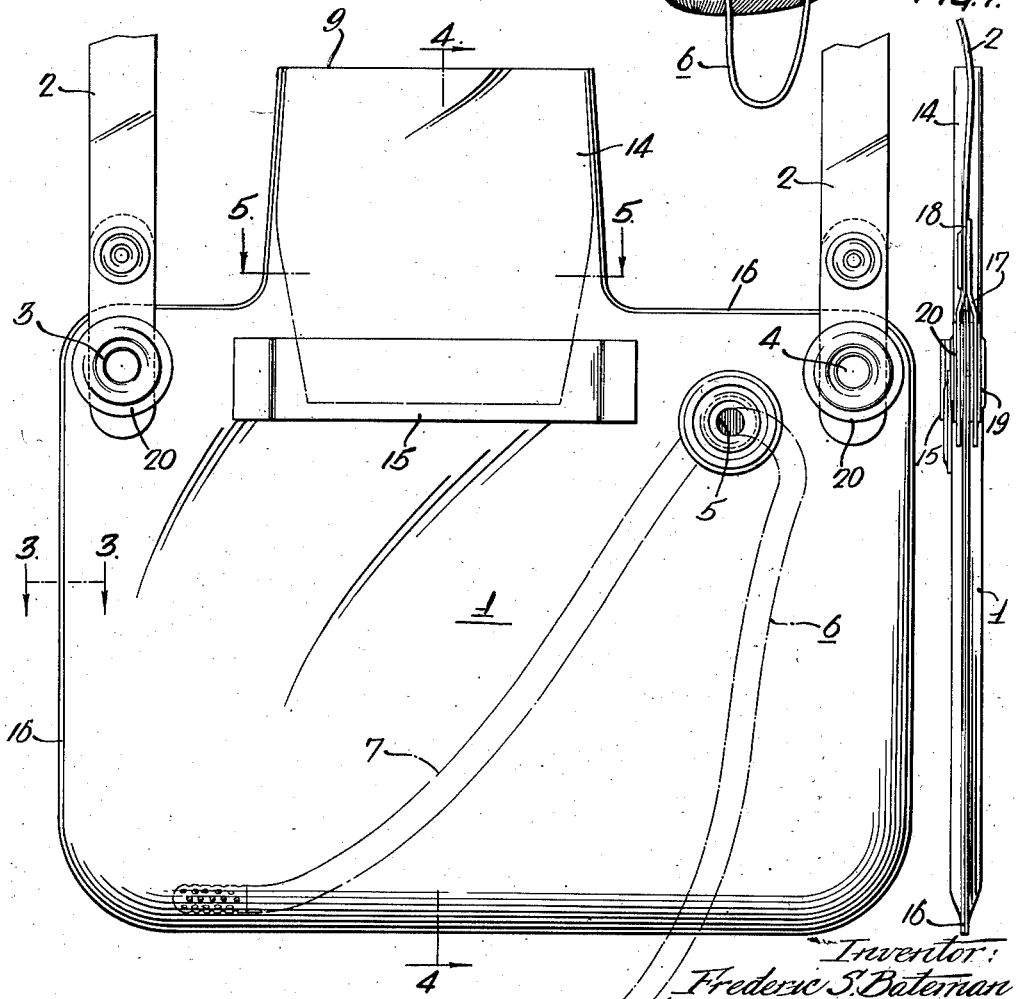
Inventor:
Frederic S. Bateman
by Howson & Howson
Attys May 21, 1957
F. S. BATEMAN
2,793,073
SPRAYING APPARATUS
Filed Sept. 15, 1955
2 Sheets-Sheet 2
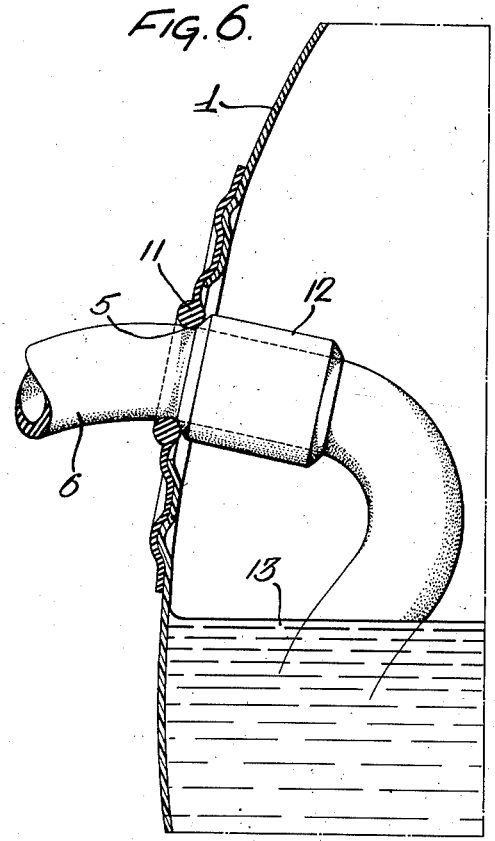
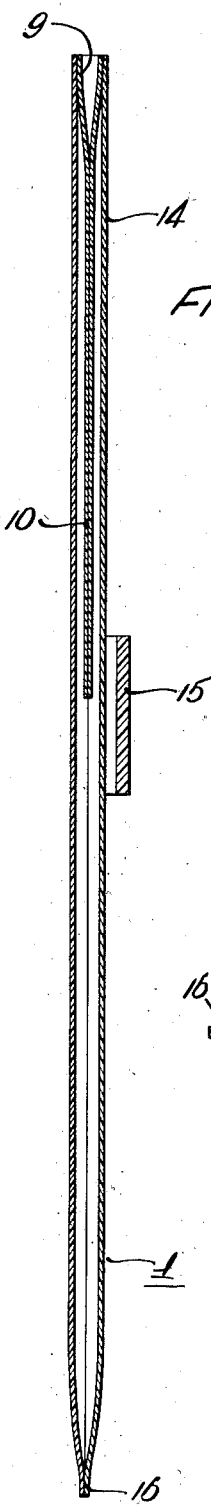
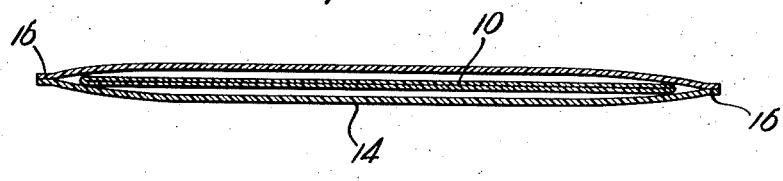
Inventor:
Frederic S. Bateman
by Howson & Howson
Attys.

United States Patent Office 2,793,073
Patented May 21, 1957

2,793,073

SPRAYING APPARATUS

Frederic S. Bateman, Wayne, Pa.

Application September 15, 1955, Serial No. 534,500

1 Claim. (Cl. 299—1)

This invention relates to improvements in apparatus for the spraying of insecticides, weed killers, and other liquid media and relates more particularly to an improved form of container constituting the reservoir from which the aforesaid media are dispensed.

One object of the invention is to provide a novel form of dispensing container for such liquid media having an inherent flexibility which will enable it to conform to the body contour and which may be carried on the body without discomfort and with a minimum of strain.

Another object of the invention is to provide a container of the aforesaid characteristics composed of a flexible material substantially immune to the effects of a wide variety of commercial insecticides and weed destroying chemicals.

Still another object of the invention is to provide a container of the stated character which may be readily filled with the liquid medium and which when so filled and adjusted to the body will be substantially leakproof.

Still another object is to provide spraying apparatus including a container of the stated character having simple and effective means for discharging the contained liquid.

A further object is to provide such spraying apparatus wherein the physical properties of the container materially facilitate the agitation of the contents to maintain any contained solids in a state of uniform suspension and to prevent settling.

The invention contemplates also a dispensing container of the stated character, including means for suspending the container on the body, which will be relatively inexpensive, which is well adapted to female use, and which may be composed of a transparent plastic material affording continuous visibility of the contents.

In the attached drawings:

Fig. 1 is a fragmentary view in perspective of an embodiment of the invention and illustrating the manner in which it may be carried by an operator;

Fig. 2 is a front or face view of the container;

Fig. 3 is a sectional view on the line 3—3, Fig. 2;

Fig. 4 is a sectional view on the line 4—4, Fig. 2;

Fig. 5 is a sectional view on the line 5—5, Fig. 2;

Fig. 6 is an enlarged fragmentary sectional view on the line 6—6, Fig. 1 illustrating a detail of the container structure, and Fig. 7 is an end elevational view of the container.

With reference to the drawings, spraying equipment in accordance with the present invention comprises a baglike container 1 made preferably of a flexible sheet material such as rubber or plastic; and I have found the vinyl plastics well suited for the purpose. In the present instance this container has attached thereto a simple strap 2 which may be and preferably is of the same material as the bag 1, and in the present instance, also, the terminal ends of the strap are secured at 3 and 4 respectively to the upper part of the bag 1. In the illustrated embodiment, the bag has an aperture 5 in the wall and adjacent the top thereof through which a flexible tube 6 passes from the interior of the container, the portion 7 of the tube which occupies the interior of the bag being of sufficient length to permit the terminal end of the tube to occupy a position in the bottom of the container as illustrated. The portion of the tube external to the container 1 is attached to a suitable spray pump 8 and is of sufficient length to afford entire freedom of movement for manipulation of this pump. In the present instance, the pump 8 is of the well-known trombone type, although it obviously may take other forms if desired.

The container 1 also has at the top an inlet opening 9 through which a liquid medium may be passed to the interior of the container. In the present instance, the side walls of the container are extended upwardly to the lip of the opening 9 and this extension 14 may be of sufficient length to permit it to be folded inwardly on itself as indicated at 10, the sides of this inturned portion normally lying in face to face contact with each other to form a valve which while admitting a liquid medium to the interior of the container will effectively preclude escape of the liquid through the filler opening.

It may be noted by reference to Fig. 6 that the aperture 5 is defined by the inner peripheral edge of a grommet 11 which is secured in the present instance to the container wall and which may be of the same material as the container, the diameter of the grommet opening being no larger and preferably slightly less than that of the tube 6 so as to provide a seal around the latter; and preferably also the tube 6 is provided with a collar 12 which will engage the inner side of the grommet, as illustrated in Fig. 6, so as to provide an additional seal precluding escape of the liquid medium between the edge of the grommet and the surface of the tube. In Figs. 1 and 6, the liquid medium is indicated by the reference numeral 13.

In the illustrated embodiment of the invention, the front wall of the container 1 is provided near the top and immediately under the inlet port extension 14 with a strap 15. This strap may be suitably secured at its opposite ends to the wall of the container and provides a handle for lifting the container and also a retaining strap for the extension 14 when the latter is folded over on itself to provide an additional sealing of the inlet port 9. Thus, when folded forwardly, the upper end of the extension 14 may be tucked behind the strap 15 which will then act to hold it in the folded position.

The container 1 may be made in any suitable manner, and when vinyl plastic or other heat-sealing material is employed may be composed of two died-out pieces of the general shape shown in Fig. 2, heat-sealed at their edges as indicated at 16 in Fig. 3, this constituting an economical and desirable mode of manufacture. The inturned valve portion 10 may also be formed as a separate element and be similarly attached by heat-sealing to the upper edge of the extension 14. Preferably, the ends of the strap 2 will be bifurcated, as by means of a flap 17 secured to the strap proper as indicated at 18 by means preferably of a heat-sealing operation, and these bifurcations, as shown in Fig. 7, will be brought down on opposite sides of the upper edge portion of the container and will be attached to the latter also by heat-sealing or by other suitable method, as indicated at 19 and 20.

The apparatus described above may be carried as illustrated in Fig. 1 by suspending the container from a shoulder; or the supporting strap may be applied to the body in other ways if desired. In any event the container will conform readily and comfortably to the confronting part of the body and may be readily moved or shaken, also without discomfort to agitate the contents if required. Entire freedom of action is afforded for operation and manipulation of the pump in spraying. The container, being effectively sealed, is free from leakage and may be used with safety with substantially all commercial insecticides and weed destroying chemicals.

I claim:

Liquid spraying apparatus comprising a container consisting of a pair of thin plastic sheets contoured to the desired shape of the container and having matching neck-like extensions projecting from one edge, said sheets being welded together around the peripheral edges with exception of the outer edges of said extensions to form a normally flat container having a projecting neck at the top constituting an admission port to the interior of the container for a liquid spray medium and affording also a means for sealing said port, a strap attached at opposite ends respectively to the upper corners of the container by which the container may be suspended freely from a shoulder of an operator, a grommeted opening in the upper part of a wall of the container above the normal level of the contained spray liquid, and a flexible plastic tube extending from the bottom interior of the container outwardly through said hole and constituting a discharge duct for the spray liquid, said tube having an outside diameter slightly in excess of the diameter of said hole so as to seal itself in the latter.

References Cited in the file of this patent

UNITED STATES PATENTS

| | | |
|---|---|---|
| 1,959,782 | Fenwick | May 22, 1934 |
| 2,027,290 | Reach | Jan. 7, 1936 |
| 2,273,128 | Madsen et al. | Feb. 17, 1942 |
| 2,328,569 | McGaw | Sept. 7, 1943 |
| 2,622,646 | Miller | Dec. 23, 1952 |

FOREIGN PATENTS

| | | |
|---|---|---|
| 394,790 | Great Britain | July 6, 1933 |